US011163854B2

(12) United States Patent
Verthein et al.

(10) Patent No.: US 11,163,854 B2
(45) Date of Patent: Nov. 2, 2021

(54) ENCODING OPTIMIZATION FOR OBFUSCATED MEDIA

(71) Applicant: MICROSOFT TECHNOLOGY LICENSING, LLC, Redmond, WA (US)

(72) Inventors: William George Verthein, Sammamish, WA (US); Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/737,857

(22) Filed: Jan. 8, 2020

(65) Prior Publication Data

US 2020/0143013 A1 May 7, 2020

Related U.S. Application Data

(62) Division of application No. 15/378,692, filed on Dec. 14, 2016, now Pat. No. 10,552,585.

(51) Int. Cl.
*G06F 21/00* (2013.01)
*G06F 21/10* (2013.01)
(Continued)

(52) U.S. Cl.
CPC .............. *G06F 21/10* (2013.01); *G06F 21/14* (2013.01); *G06F 21/6245* (2013.01);
(Continued)

(58) Field of Classification Search
CPC .......... G06F 21/10; G06F 21/14; G06F 21/82; G06F 21/6245; H04L 12/1827;
(Continued)

(56) References Cited

U.S. PATENT DOCUMENTS 6,937,730 B1 * 8/2005 Buxton .................. H04N 7/163
  348/E7.061
2002/0037081 A1 * 3/2002 Rogoff ................... H04N 7/165
  380/278

(Continued)

FOREIGN PATENT DOCUMENTS

CN   102685097 A   9/2012
CN   103718152 A   4/2014
(Continued)

OTHER PUBLICATIONS

"First Office Action and Search Report Issued in China Patent Application No. 201780077604.8", dated Jan. 29, 2021, 13 Pages.

*Primary Examiner* — Kendall Dolly
(74) *Attorney, Agent, or Firm* — NovoTechIP International PLLC

(57) ABSTRACT

In a device including a processor and a memory in communication with the processor, the memory includes executable instructions that, when executed by the processor, cause the processor to control the device to perform functions of dividing a video image into a plurality of encoding blocks, the video image including a sharing-protected portion; adjusting, based on a size or location of the sharing-protected portion, a configuration of the encoding blocks such that the sharing-protected portion is divided into a smaller number of the encoding blocks; individually encoding, based on the adjusted configuration of the encoding blocks, the encoding blocks; and transmitting, to a remote device via a communication network, the individually encoded encoding blocks.

20 Claims, 10 Drawing Sheets

(51) Int. Cl.
*H04L 29/06* (2006.01)
*H04L 12/18* (2006.01)
*H04L 9/06* (2006.01)
*H04L 12/58* (2006.01)
*G06F 21/14* (2013.01)
*G06F 21/82* (2013.01)
*G06F 21/62* (2013.01)

(52) U.S. Cl.
CPC .............. *G06F 21/82* (2013.01); *H04L 9/065* (2013.01); *H04L 12/1827* (2013.01); *H04L 51/046* (2013.01); *H04L 65/40* (2013.01); *H04L 65/403* (2013.01); *H04L 65/4015* (2013.01)

(58) Field of Classification Search
CPC ... H04L 9/065; H04L 51/046; H04L 65/4015; H04L 65/40; H04L 65/403
See application file for complete search history.

(56) References Cited

U.S. PATENT DOCUMENTS

| | | | | |
|---|---|---|---|---|
| 2010/0060788 | A1* | 3/2010 | Blackburn | G06F 3/0484 348/563 |
| 2012/0050298 | A1* | 3/2012 | Abdo | G06T 15/005 345/501 |
| 2012/0121082 | A1* | 5/2012 | Choi | H04L 9/0897 380/28 |
| 2017/0272100 | A1* | 9/2017 | Yanovsky | G06F 3/0619 |

FOREIGN PATENT DOCUMENTS

| | | |
|---|---|---|
| CN | 103902808 A | 7/2014 |
| CN | 105959741 A | 9/2016 |
| WO | 2015121708 A1 | 8/2015 |

* cited by examiner

ENCODING OPTIMIZATION FOR OBFUSCATED MEDIA

CROSS-REFERENCE TO RELATED APPLICATIONS

This application is a divisional of co-pending U.S. patent application Ser. No. 15/378,692, titled "Encoding Optimization for Obfuscated Media," filed on Dec. 14, 2016, which is incorporated hereto by reference in its entirety.

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

While UC&C systems provide for increased flexibility in communications, they also present a number of implementation challenges. For instance, a user may wish to share screen content to different devices engaged in UC&C communication. The user, however, may wish to protect some screen content from being shared. Enabling concurrent screen sharing and content protection presents a number of implementation challenges.

SUMMARY

In an implementation, in a device including a processor and a memory in communication with the processor, the memory includes executable instructions that, when executed by the processor, cause the processor to control the device to perform functions of dividing a video image into a plurality of encoding blocks, the video image including a sharing-protected portion; adjusting, based on a size or location of the sharing-protected portion, a configuration of the encoding blocks such that the sharing-protected portion is divided into a smaller number of the encoding blocks; individually encoding, based on the adjusted configuration of the encoding blocks, the encoding blocks; and transmitting, to a remote device via a communication network, the individually encoded encoding blocks.

In another implementation, a method of operating a device for optimizing a video image for transmission via a communication network, includes dividing a video image into a plurality of encoding blocks, the video image including a sharing-protected portion; adjusting, based on a size or location of the sharing-protected portion, a configuration of the encoding blocks such that the sharing-protected portion is divided into a smaller number of the encoding blocks; individually encoding, based on the adjusted configuration of the encoding blocks, the encoding blocks; and transmitting, to a remote device via a communication network, the individually encoded encoding blocks.

In another implementation, a non-transitory computer readable medium contains instructions which, when executed by a processor, cause a computer to perform functions of dividing a video image into a plurality of encoding blocks, the video image including a sharing-protected portion; adjusting, based on a size or location of the sharing-protected portion, a configuration of the encoding blocks such that the sharing-protected portion is divided into a smaller number of the encoding blocks; individually encoding, based on the adjusted configuration of the encoding blocks, the encoding blocks; and transmitting, to a remote device via a communication network, the individually encoded encoding blocks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Identical numerals followed by different letters in a reference number may refer to difference instances of a particular item.

DETAILED DESCRIPTION

Figure 1:
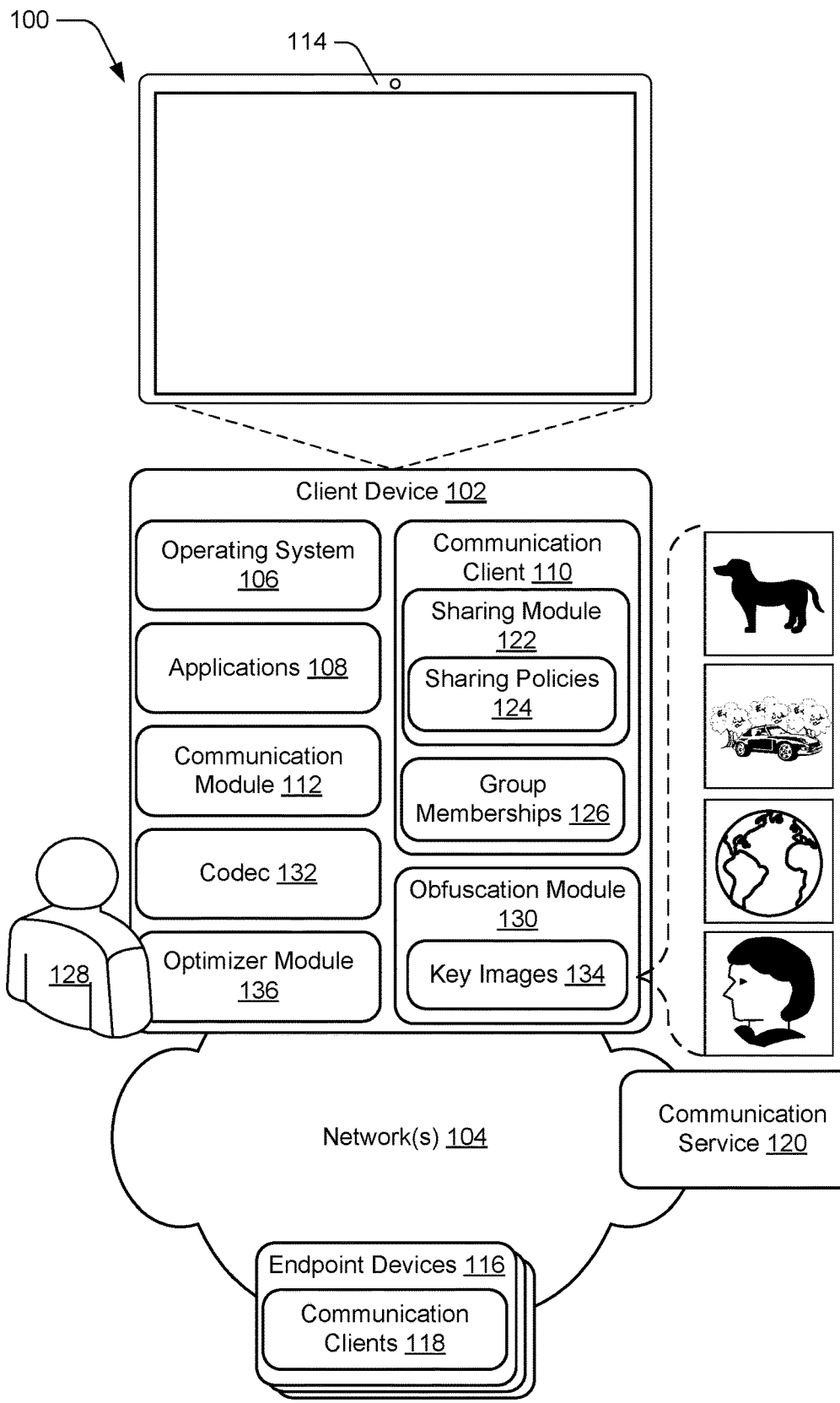
FIG. 1 is an illustration of an environment in an example implementation that is operable to employ techniques discussed herein.

Techniques for encoding optimization for obfuscated media are described. In at least some implementations, a media sharing experience involves a user sharing portions of their display screen with other users as part of a communication session. As used herein, media refer to various types of content, such as video, audio, text content, images, and so forth. A communication session, for instance, refers to a real-time exchange of communication media between different communication endpoints. Examples of a communication session include a Voice over Internet Protocol (VoIP) call, a video call, text messaging, a file transfer, content sharing, and/or combinations thereof. In at least one implementation, a communication session represents a Unified Communication and Collaboration (UC&C) session.

According to various implementations, a user that is sharing their screen with other devices as part of a media sharing experience wishes to protect a portion of the screen from being shared. For instance, a portion of their screen may be displaying sensitive and/or personal information that the user doesn't wish to share. Accordingly, the user invokes a sharing protect functionality to enables the user to identify a portion of their screen that is not to be shared with the other devices. The user, for instance, can draw a protection zone around a portion of their screen that they wish to sharing protect. Other ways of designating a particular portion of a display as sharing protected are described below. Thus, media from the identified portion of the user's screen ("protected media") is obfuscated while other portions are shared in the clear as part of the screen sharing experience.

According to various implementations, the protected media is obfuscated using a key image as an obfuscation key. The protected media and the key image, for instance, are used as inputs to an exclusive or (XOR) operation to generate obfuscated video data. Generally, a key image represents a digital image such as a digital photograph, a digital drawing, a scanned image, and so forth. Using an image as an obfuscation key provides increased encoding and decoding performance as compared to typical data obfuscation using a random key since image data for an image is interrelated in terms of pixel-interrelation. That is, encoding (compression) of random data such as a random obfuscation key is resource intensive since random data is difficult to compress. However, data that has some predictable interrelation, such as image data, is more easily compressed. Thus, using an image key to obfuscate media reduces resource usage for encoding of obfuscated media.

According to one or more implementations, a user can be designated as sharing privileged such that the user is permitted to view media that is designated as sharing protected and is thus obfuscated. For instance, a sharing user that specifies a portion of their display screen as sharing protected can identify a participant in the screen sharing experience as sharing privileged. Thus, a device associated with the privileged participant has access to a key image such that the device can deobfuscate obfuscated media from the sharing protect portion of the screen and display the deobfuscated media in the clear. Other non-privileged participants in the screen sharing experience, however, do not have access to the key image and thus cannot deobfuscate and view the protected media. In this way, a user can protect certain screen content from general sharing, while designating a set of privileged users that are permitted to view the content.

According to one or more implementations, encoding optimization for obfuscated media includes optimizing an encoding block structure used to encode and decode obfuscated media. Generally, an encoding block structure refers to sizes and arrangements (e.g., positions) of encoding blocks that are used to partition media for encoding. As further detailed below, optimizing an encoding block structure can reduce computational resources needed to encode obfuscated content, and to decode and deobfuscate obfuscated content.

Accordingly, techniques for encoding optimization for obfuscated media described herein enhance the ability for users to protect sensitive media and data during a media sharing experience, thus improving data security for sensitive user data and preventing undesired exposure of sensitive user media. The described techniques also improve computing device performance during a media sharing experience by optimizing media encoding used to encode the media.

In the following discussion, an example environment is first described that is operable to employ techniques described herein. Next, some example implementation scenarios are described in accordance with one or more embodiments. Following this, some example procedures are described in accordance with one or more embodiments. Finally, an example system and device are described that are operable to employ techniques discussed herein in accordance with one or more embodiments. Consider now an example environment in which example implementations may by employed.

FIG. 1 is an illustration of an environment 100 in an example implementation that is operable to employ techniques for encoding optimization for obfuscated media described herein. Generally, the environment 100 includes various devices, services, and networks that enable communication via a variety of different modalities. For instance, the environment 100 includes a client device 102 connected to a network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The network 104 is representative of a network that provides the client device 102 with connectivity to various networks and/or services, such as the Internet. The network 104 may provide the client device 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The client device 102 includes a variety of different functionalities that enable various activities and tasks to be performed. For instance, the client device 102 includes an operating system 106, applications 108, a communication client 110, and a communication module 112. Generally, the operating system 106 is representative of functionality for abstracting various system components of the client device 102, such as hardware, kernel-level modules and services, and so forth. The operating system 106, for instance, can abstract various components of the client device 102 to the applications 108 to enable interaction between the components and the applications 108.

The applications 108 represent functionalities for performing different tasks via the client device 102. Examples of the applications 108 include a word processing application, a spreadsheet application, a web browser, a gaming application, and so forth. The applications 108 may be installed locally on the client device 102 to be executed via a local runtime environment, and/or may represent portals to remote functionality, such as cloud-based services, web apps, and so forth. Thus, the applications 108 may take a variety of forms, such as locally-executed code, portals to remotely hosted services, and so forth.

The communication client 110 is representative of functionality to enable different forms of communication via the client device 102. Examples of the communication client 110 include a voice communication application (e.g., a VoIP client), a video communication application, a messaging application, a content sharing application, a unified communication & collaboration (UC&C) application, and combinations thereof. The communication client 110, for instance, enables different communication modalities to be combined to provide diverse communication scenarios.

The communication module 112 is representative of functionality for enabling the client device 102 to communicate data over wired and/or wireless connections. For instance, the communication module 112 represents hardware and logic for data communication via a variety of different wired and/or wireless technologies and protocols.

The client device 102 further includes a display device 114, which represents functionality for visual output for the client device 102. Additionally, the display device 114 represents functionality for receiving various types of input, such as touch input, pen input, and so forth.

The environment 100 further includes endpoint devices 116, which are representative of devices and/or functionalities with which the client device 102 may communicate. In at least some implementations, the endpoint devices 116 represent end-user devices such as discussed with reference to the client device 102. The endpoint devices 116 include communication clients 118, which are representative of functionalities to enable different forms of communication via the endpoint devices 116. The communication clients 118, for example, represent different instances of the communication client 110. For purposes of discussion herein, reference is made to an endpoint device 116 and a communication client 118, which represent instances of the endpoint devices 116 and the communication clients 118, respectively.

In at least some implementations, the communication clients 110, 118 represent interfaces to a communication service 120. Generally, the communication service 120 is representative of a service to perform various tasks for management of communication between the client device 102 and the endpoint device 116. The communication service 120, for instance, can manage initiation, moderation, and termination of communication sessions between the communication clients 110, 118.

The communication service 120 maintains a presence across many different networks and can be implemented according to a variety of different architectures, such as a cloud-based service, a distributed service, a web-based service, and so forth. Examples of the communication service 120 include a VoIP service, an online conferencing service, a UC&C service, and so forth.

The communication client 110 further includes a sharing module 122, which is representative of functionality for performing various aspects of techniques for encoding optimization for obfuscated media discussed herein. Various attributes and operational aspects of the sharing module 122 are detailed below. The sharing module 122 maintains sharing policies 124, which are representative of different sets of data that specify permissions and criteria for sharing media between the client device 102 and the endpoint devices 116. The sharing policies 124, for instance, specify which regions of the display device 114 may be shared with the endpoint devices 116, and which regions of the display device 114 may not be shared with the endpoint devices 116.

Alternatively or additionally, the sharing policies 124 are media and/or application-specific. For example, the sharing policies 124 can specify certain types of media that are permitted to be shared with the endpoint devices 116, and other types of media that are not permitted to be shared with the endpoint devices 116. Further, the sharing policies 124 can specify that an application window for a particular application 108 is permitted to be shared, whereas an application window for a different application 108 is not permitted to be shared. Generally, the sharing policies 124 can be configured in various ways, such as via default settings specified by an application developer, end user-specified settings, by information technology (IT) personnel, and so forth.

The communication client 110 further maintains and/or has access to group memberships 126, which represent identifiers for different groups that a user 128 of the client device 102 is a member of Generally, a "group" refers to a grouping of different users based on different criteria. A particular group, for instance, represents a collection of user identifiers and/or device identifiers that belong to the particular group. Generally, a group may be created and managed to control access to hardware resources, software resources, media (e.g., content), file systems (e.g., directories), and so forth. Examples of a group include a user group, an email group, a directory group, and so forth. In at least some implementations, sharing policies 124 identify specific privileged groups with which a sharing protected region may be shared "in the clear." Generally, the term "in the clear" as used herein refers to the ability to view media in an unobfuscated and/or unobscured form, such as enabled via decryption of obfuscated media. For instance, a particular sharing policy 124 can specify that sharing protected media may be shared with a particular group, but is not to be shared with users outside of the particular group, e.g., users that are not a member of the particular group. Alternatively or additionally to designating sharing privileged groups, the sharing policies 124 may designate specific sharing privileged users, devices, network domains, and so forth.

While the sharing module 122 and the sharing policies 124 are depicted as being implemented on the client device 102, it is to be appreciated that in some additional or alternative implementations, functionality of the sharing module 122 and/or the sharing policies 124 may be partially or wholly implemented via a network-based service, such as the communication service 120. For instance, the communication service 120 may perform various aspects of techniques for encoding optimization for obfuscated media described herein.

The client device 102 further includes an obfuscation module 130 and a codec 132. The obfuscation module 130 is representative of functionality for obfuscating and deobfuscating data, such as for obfuscating media as part of a media sharing experience. For at least this purpose, the obfuscation module 130 includes and/or has access to key images 134, which are representative of images that can be used as keys to obfuscate and deobfuscate data. Generally, the key images 134 represent different digital images in different formats, such as bitmap, JPEG (Joint Photographic Experts Group), TIFF (Tagged Image File Format), and so forth. The key images 134, for instance, can be used by the obfuscation module 130 to obfuscate sharing protected media. Sharing protected media, for instance, may be obfuscated by the obfuscation module 130 such that an endpoint device 116 that receives the obfuscated media cannot view the media in the clear unless the endpoint device 116 has access to a particular key image 134 that was used to obfuscate the media.

The codec 132 is representative of functionality for encoding and decoding media, such as for encoding and decoding a media stream (e.g., including video, audio, files, and so forth) that is generated as part of a media sharing experience. The codec 132, for instance, is configured to perform compression and decompression of media data, such as to reduce transmission bandwidth required to transmit a media stream as part of a screen sharing experience.

The client device 102 further includes an optimizer module 136, which is representative of functionality for optimizing encoding and obfuscation performance as part of a media sharing experience. As further detailed below, the optimizer module 136 can optimize encoding block structures that are used to encode and decode media as part of a media sharing experience.

Having described an example environment in which the techniques described herein may operate, consider now a discussion of an example implementation scenario for encoding optimization for obfuscated media in accordance with one or more embodiments.

The following section describes some example implementation scenarios for encoding optimization for obfuscated media in accordance with one or more implementations. The implementation scenarios may be implemented in the environment 100 discussed above, and/or any other suitable environment.

Figure 2:
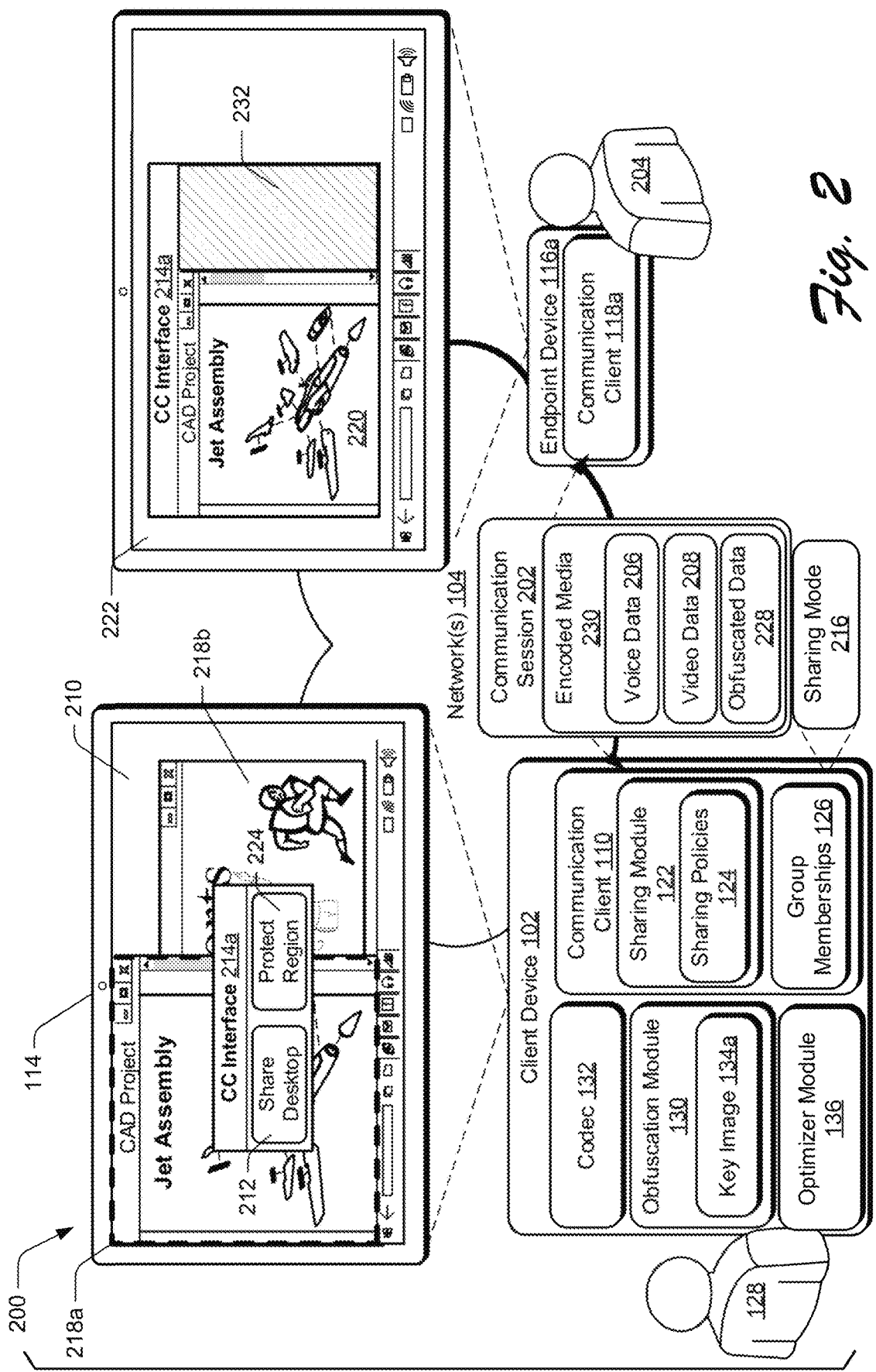
FIG. 2 depicts an example implementation scenario for protecting media during a screen sharing experience in accordance with one or more embodiments.

FIG. 2 depicts an example implementation scenario 200 for protecting media during a screen sharing experience in accordance with one or more implementations. The scenario 200 includes various entities and components introduced above with reference to the environment 100.

In the scenario 200, the user 128 of the client device 102 is engaged in a communication session 202 with a user 204 of an endpoint device 116a. Generally, the communication session 202 represents a real-time exchange of different communication media between the client device 102 and the endpoint device 116a, such as audio, video, files, media content, and/or combinations thereof. In this particular example, the communication session 202 involves a real-time exchange of voice data 206 and video data 208 between the client device 102 and the endpoint device 116a over the network 104.

As part of the communication session 202, the user 128 performs an action to share a portion of a desktop 210 of the display device 114 with the user 204. Generally, the desktop 210 represents a portion of the display device 114 in which different interfaces and controls for applications, tasks, system operations, and so forth, are displayed. For instance, the user 128 selects a share control 212 from a communication client interface 214a. Generally, the communication client interface 214a represents an interface for the communication client 110 that enables the user 128 to perform various actions and view status information pertaining to the communication session 202. Selection of the share control 212 activates a sharing mode 216 that causes at least a portion of the desktop 210 to be shared with the endpoint device 116a.

Accordingly, responsive to the user action to activate the sharing mode 216, a region 218a of the desktop 210 is shared with the endpoint 116a. The user action to share the desktop 210 causes a visual representation 220 of the region 218a to be presented within a communication client interface 214a displayed on a display 222 of the endpoint device 116a. The visual representation 220, for instance, represents a live copy of the region 218a that is communicated from the client device 102 to the endpoint device 116a as part of the video data 208. Generally, the communication client interface 214a represents a GUI of the communication client 118.

Notice that while the region 218a is shared to the endpoint device 116a, a different region 218b of the desktop 210 is not shared in the clear to the endpoint device 116a. According to techniques for encoding optimization for obfuscated media described herein, the region 218b is designated as a protected region that is not to be shared with the endpoint device 116a. Generally, the region 218b can be designated as a protected region in various ways, such as by a user action that identifies the region 218b as a protected region. For instance, the user 128 selects a protect control 224 from the communication client interface 214a, which activates a sharing protect mode that enables the region 218b to be designated as sharing protected. Alternatively or additionally to selection of the protect control 224, various other actions can cause a region of media to be protected, such as a user action drawing a rectangle and/or other shape around a region to be protected, an application being designated as sharing protected, certain media and/or data types being designated as sharing protected, and so forth.

While the region 218b is depicted in the scenario 200 as a separate region from the region 218a, it is to be appreciated that in at least some implementations, the region 218b may be a subset of the region 218a. The region 218b, for instance, can represent media that is embedded within the region 218a. Thus, a subset of a larger set of media can be sharing protected while other portions of the larger set of media are not sharing protected as part of a media sharing experience.

To enable media from the region 218b to be protected from sharing to the endpoint device 116a, the communication client 110 interfaces with the obfuscation module 130 to cause the region 218b to be obfuscated using a key image 134a. For instance, the sharing module 122 passes a region identifier ("ID") 226 for the region 218b to the obfuscation module 130, and the obfuscation module 130 obfuscates media from the region 218b using the key image 134a to generate obfuscated video data 228. Generally, the region ID 226 may be implemented in various ways, such as pixel coordinates that define the region 218b, an application identifier for an application 108 that presents media within the region 218b, a file identifier for media presented within the region 218b, and so forth.

Further to the scenario 200, the voice data 206, the video data 208, and the obfuscated data 228 are encoded by the codec 132 to generate encoded media 230. As further detailed below, the optimizer module 136 optimizes the encoding by determining an encoding block structure to be used for encoding the various data. The encoding block structure, for instance, is based on a size and position of the media included in the region 218b.

Accordingly, the encoded media 230 is communicated with the data stream of the communication session 202. However, since the endpoint device 116a does not have access to the key image 134a, the endpoint device 116a is not able to deobfuscate the obfuscated video data 228 and display media from the region 218b in the clear. Thus, the obfuscated video data 228 is displayed as an obfuscated image 232. The obfuscated image 232, for instance, represents video output of the decoded obfuscated video data 228. Since media from the region 218b is obfuscated to generate the obfuscated video data 228, the obfuscated image 232 does not present the media in the clear, thus protecting the media from being viewed in the clear at the endpoint device 116a.

In this way, different regions of a display area (e.g., a desktop) can be defined as sharing restricted to enable some portions of a display to be shared, and other portions to be protected from sharing. Generally, media can be designated as sharing protected dynamically and while the communication session 202 is in progress. For instance, the user 128 can perform actions to cause sharing protection for the region 218b to be applied and then later removed and while the communication session 202 is in progress. Alternatively or additionally, certain media can be persistently designated as sharing protected such that sharing protection is automatically applied across multiple separate communication sessions. Persistent sharing protection, for example, can be applied based on an application ID, a media type, a specific portion of the desktop 210, and so forth.

Figure 3:
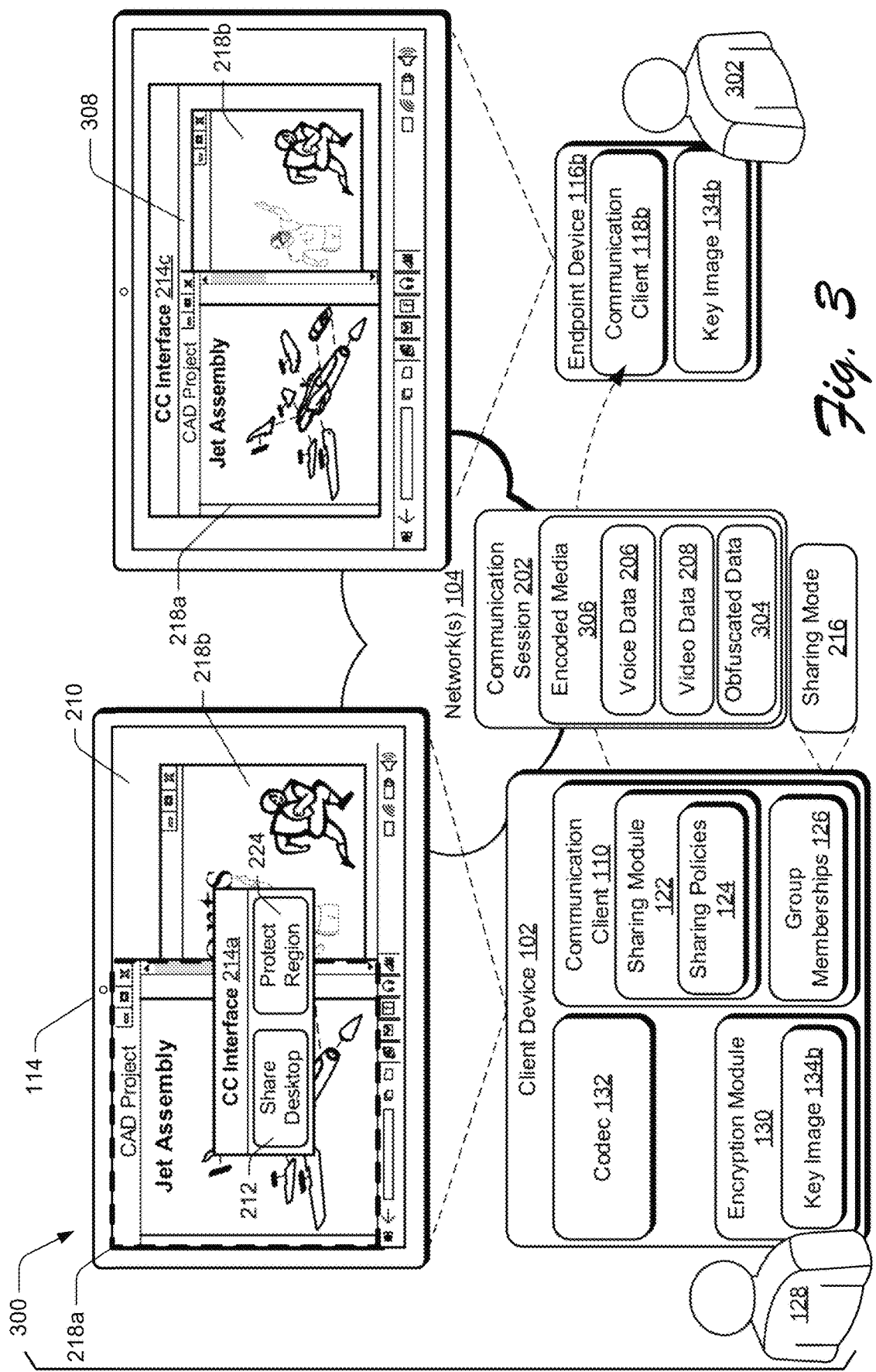
FIG. 3 depicts an example implementation scenario for enabling sharing protected media to be accessible by a privileged user during a screen sharing experience in accordance with one or more embodiments.

FIG. 3 depicts an example implementation scenario 300 for enabling sharing protected media to be accessible by a privileged user during a screen sharing experience in accordance with one or more implementations. The scenario 300 includes various entities and components introduced above with reference to the environment 100. In at least some implementations, the scenario 300 represents a continuation and/or variation of the scenario 200 described above.

In the scenario 300, the user 128 is participating in a screen sharing experience with a user 302 as part of the communication session 202, and designates the region 218b as sharing protected. In response, the obfuscation module 130 obfuscates media from the region 218b with a key image 134b to generate obfuscated video data 304. The voice data 206, the video data 208, and the obfuscated video data 304 are then encoded by the codec 132 to generate encoded media 306. As further detailed below, the optimizer module 136 optimizes the encoding by determining an encoding block structure to be used for encoding the various data. The encoding block structure, for instance, is based on a size and position of the media included in the region 218b. Thus, the encoded media 306 is transmitted to an endpoint device 116b of the user 302.

In this particular scenario, the endpoint device 116b includes and/or has access to the key image 134b which was used by the client device 102 to obfuscate the obfuscated video data 304. Accordingly, the endpoint device 116b can deobfuscate the obfuscated video data 304 to enable a visual representation 308 of the desktop 210 to be displayed, including media from the region 218a and the region 218b in the clear as part of a communication client interface 214b for a communication client 118b. Other endpoints 116 participating in the communication session 202 that don't have access to the key image 134b may receive the obfuscated video data 304, but will not be able to deobfuscate the obfuscated data 304 and view the region 218b in the clear.

Generally, the endpoint device 116b may have access to the key image 134b in various ways. For example, the key image 134b may be communicated to the endpoint device 116b along with an invite to participate in the communication session 202, such as embedded in and/or attached to the invite. As another example, the key image 134b may be communicated to the endpoint device 116b separately from an invite, such as part of an email, in instant message, a text message, and so forth.

In one example implementation, the key image 134b may be accessible to the endpoint device 116b by virtue of the user 302 being a member of a privileged group that is entitled to access the key image 134b. For instance, membership in a common group entitles its users to access the key image 134b, and users outside of that group that are not specifically designated as sharing privileged are not entitled to access the key image 134b. In at least some implementations, the key image 134b is available to the endpoint 116b by virtue of the user 302 and the user 128 both being members of the same group. For instance, group privileges for the group entitle its members to access the key image 134b.

Figure 4:
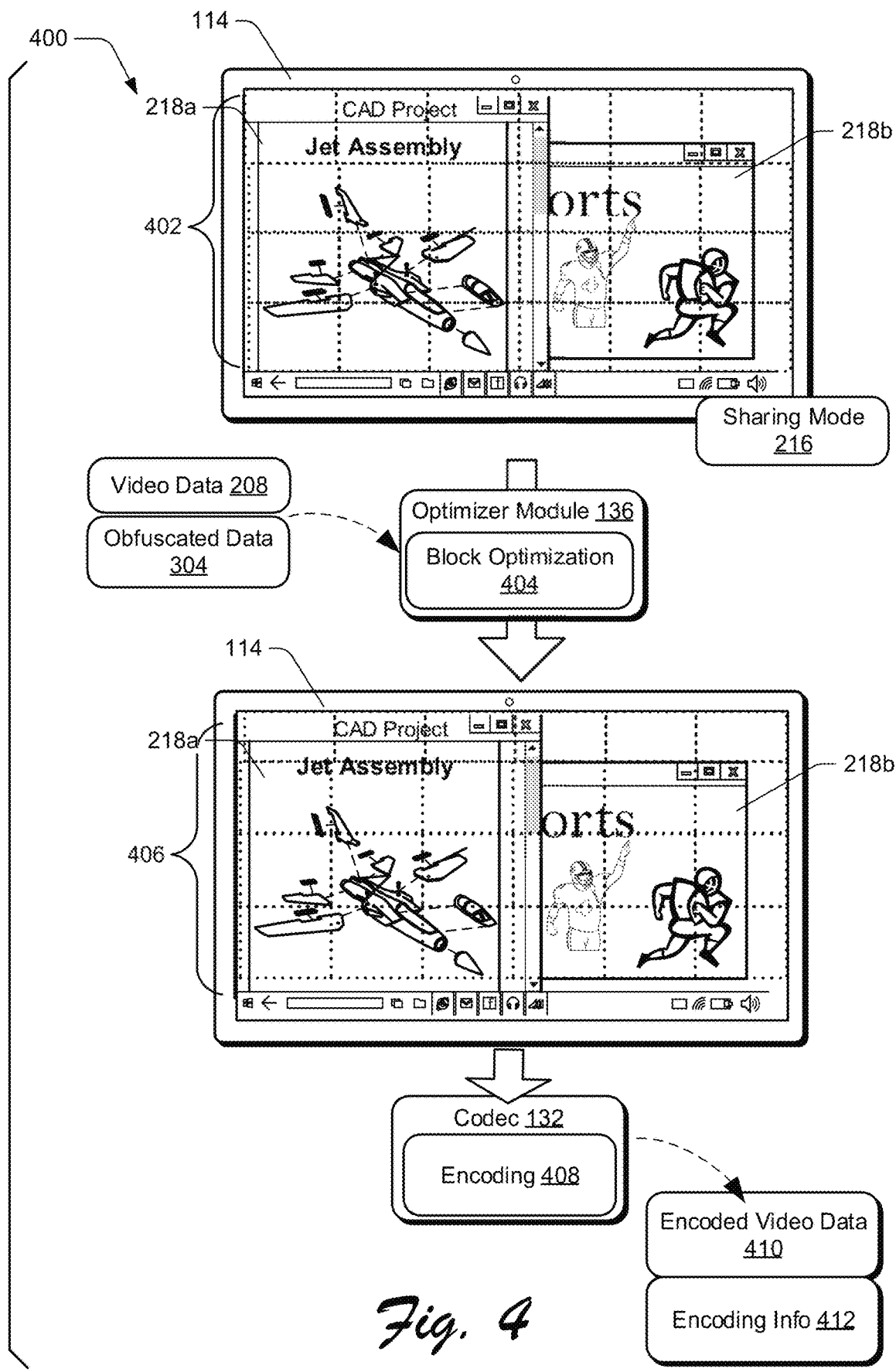
FIG. 4 depicts an example implementation scenario for encoding block optimization for encoding a screen sharing experience in accordance with one or more embodiments.

FIG. 4 depicts an example implementation scenario 400 for encoding block optimization for encoding a screen sharing experience in accordance with one or more implementations. Generally, the scenario 400 can be performed as part of the scenarios 200, 300 described above.

The upper portion of the scenario 400 depicts the display device 114 with the desktop 210 displayed. Further, the sharing mode 216 is active, such as described in the scenarios above. For instance, portions of the desktop 210 are shared with one or more of the endpoint devices 116 as part of a screen sharing experience. As described above, the region 218a is shared and the region 218b is designated as sharing protected such that media from the region 218b is not shared in the clear with other devices unless the other devices are designated as sharing privileged. Media from the region 218a, for instance, is included in the video data 208, and media from the region 218b is included in the obfuscated data 304.

Also depicted in the upper portion of the scenario 400 is a block grid 402 which is visually depicted as dashed lines over the desktop 210. Generally, the block grid 402 represents a division of the desktop 210 media into encoding blocks for purposes of encoding prior to transmission to a different device. The block grid 402 can include various types of encoding blocks, such as macroblocks, transform blocks, prediction blocks, and so forth. Media of the desktop 210, for instance, is divided into individual encoding blocks of the block grid 402 such that each encoding block is individually encoded to generate encoded video data for transmission as part of the screen sharing experience. Various encoding techniques that utilize encoding blocks may be employed, such as H.261, H.264, H.265, and so forth.

In the upper portion of the scenario 400, media from the sharing protected region 218b is included in 12 different encoding blocks of the block grid 402. Proceeding to the lower portion of the scenario 400, the optimizer module 136 performs a block optimization 404 procedure to optimize the encoding blocks of the block grid 402 for encoding the sharing protected region 218b, i.e., the obfuscated data 304. To perform the block optimization 404, the position of the block grid 402 on the desktop 210 is shifted to generate an optimized grid 406 that reduces the number of encoding blocks that include media from the protected region 218b. The position of the block grid 402, for instance, is shifted upward, downward, rightward, and/or leftward relative to the desktop 210 to reduce the number of encoding blocks that include the obfuscated media 304.

Thus, as shown, the optimized grid 406 has 9 different encoding blocks that include media from the sharing protected region 218b, which is less than that of the original block grid 402. In this particular scenario, the sizes of the individual encoding blocks are not changed, just the positions. However, in some additional or alternative scenarios, position and/or size of encoding blocks can be altered to optimize encoding of media.

Proceeding with the scenario 400, the codec 132 performs an encoding procedure 408 that encodes the desktop 210 based on the optimized grid 406 to generate encoded video data 410. The encoded video data 410, includes the video data 208 and the obfuscated data 304 in encoded form. Generally, media from the individual encoding blocks of the optimized grid 406 are used as input into the encoding 408 to generate the encoded video data 410. Media of the desktop 210, for instance, is divided into frames for encoding using the encoding blocks of the optimized grid 406.

Notice that the encoded video data 410 is associated with encoding information 412. Generally, the encoding information 412 includes various information about how the encoded video data 410 was encoded, such as an encoding protocol (e.g., H.265, H.265, and so forth), an encoding rate, and so on. In this particular implementation, the encoding information 412 specifies position information for the optimized grid 406 relative to the original, pre-encoded media of the desktop 210. The position information, for instance, includes pixel coordinate boundaries from the desktop 210 for the individual encoding blocks of the optimized grid 406 and relative to the pixels of the desktop 210. Thus, a codec that receives the encoded video data 410 and the encoding information 412 can utilize the encoding information 412 to decode the encoded video data 410 for display. The encoding information 412 may be associated with and/or included as part of the encoded video data 410 in various ways. For instance, the encoding information may be included as part of a sequence parameter set (SPS) and/or a picture parameter set (PPS) included as part of (e.g., at the beginning of) the encoded video data 510.

According to various implementations, reducing a number of encoding blocks that include the obfuscated data 304 simplifies the encoding 408 and a subsequent decoding process, thus reducing computing resources required to perform the encoding/decoding. For example, since the obfuscated data 304 is more complex than video data that is non-obfuscated (i.e., in the clear), encoding and decoding of the obfuscated data 304 typically uses more computing resources, such as processor and memory resources. Thus, by reducing a number of encoding blocks that include obfuscated data, overall complexity of encoding media of the desktop 210 is reduced. Further, deobfuscation at a receiving device is simplified since fewer decoded blocks will need to be deobfuscated to view media from the region 218b in the clear.

Figure 5:
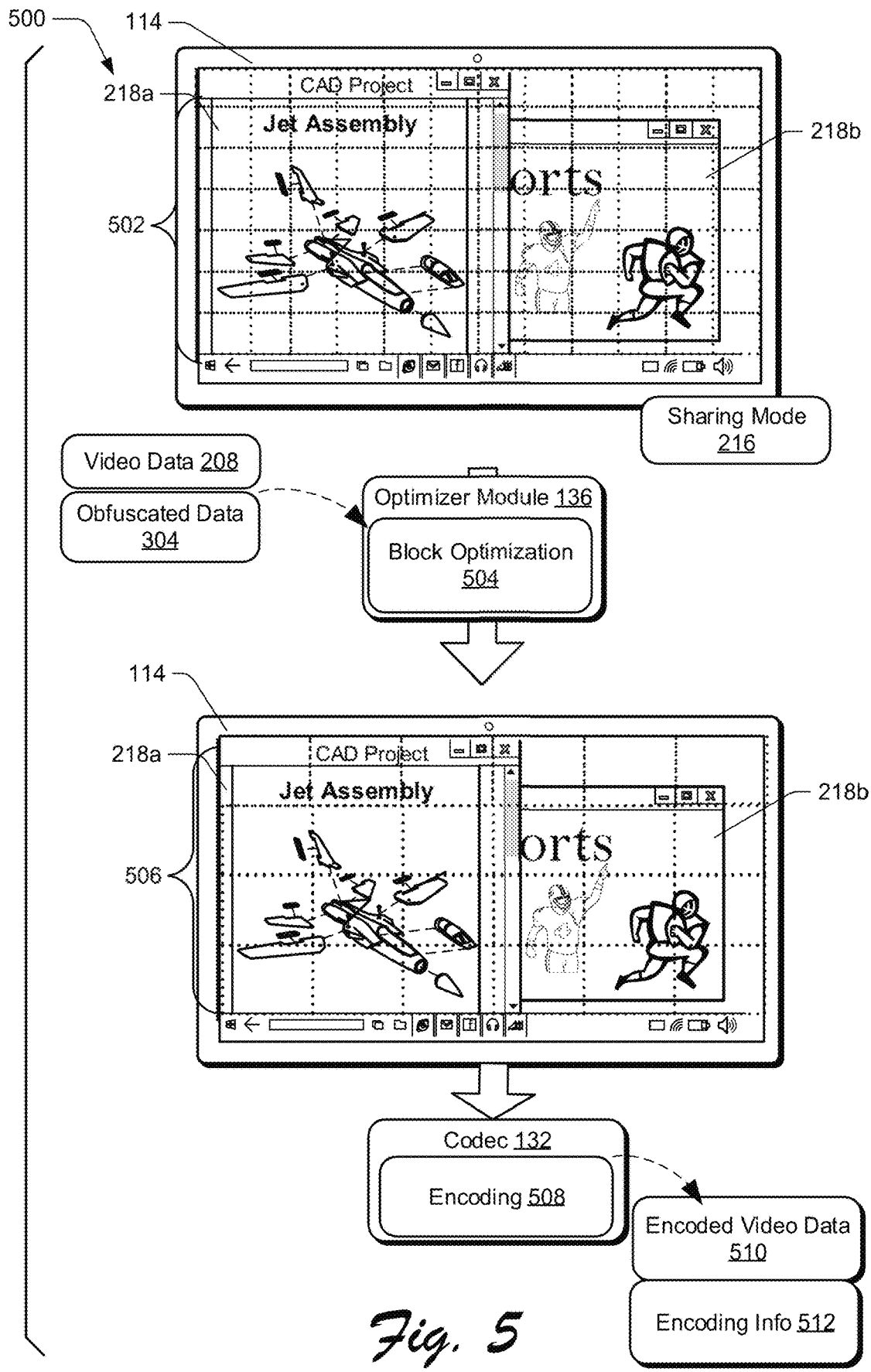
FIG. 5 depicts an example implementation scenario for encoding block optimization for encoding a screen sharing experience in accordance with one or more embodiments.

FIG. 5 depicts an example implementation scenario 500 for encoding block optimization for encoding a screen sharing experience in accordance with one or more implementations. Generally, the scenario 500 can be performed as part of the scenarios 200, 300 described above. The scenario 500, for instance, can be performed alternatively or additionally to the scenario 400 described above.

The upper portion of the scenario 500 depicts the display device 114 with the desktop 210 displayed and the sharing mode 216 active. Also depicted in the upper portion of the scenario 500 is a block grid 502 which is visually depicted as dashed lines over the desktop 210. The block grid 502, for instance, represents a variation on the block grid 402 detailed above. The block grid 502 overlays the regions 218a, 218b of the desktop 210.

In the upper portion of the scenario 500, media from the sharing protected region 218b is included in 36 different encoding blocks of the block grid 502. Proceeding to the lower portion of the scenario 500, the optimizer module 504 performs a block optimization 504 procedure to optimize the encoding blocks of the block grid 502 for encoding the sharing protected region 218b, i.e., the obfuscated data 304. To perform the block optimization 504, the sizes of the individual encoding blocks of the block grid 502 are increased to generate an optimized grid 506. In an optional implementation, and in addition to increasing sizes of the encoding blocks of the block grid 502, positions of the encoding blocks on the desktop 210 can be shifted to generate the optimized grid 506. An example implementation for shifting position of a block grid is described above with reference to the scenario 400.

As shown, the optimized grid 506 reduces the number of encoding blocks that include media from the protected region 218b. Accordingly, the optimized grid 506 includes 12 different encoding blocks that include media from the sharing protected region 218b, which is less than that of the original block grid 502.

Proceeding with the scenario 500, the codec 132 performs an encoding procedure 508 that encodes the desktop 210 based on the optimized grid 506 to generate encoded video data 510. The encoded video data 510 includes the video data 208 and the obfuscated data 304 in encoded form. Generally, media from the individual encoding blocks of the optimized grid 506 are used as input into the encoding 508 to generate the encoded video data 510. Media of the desktop 210, for instance, is divided into frames for encoding based on the encoding blocks of the optimized grid 506.

The encoded video data 510 is associated with encoding information 512, which represents various information about how the encoded video data 510 was encoded, such as an encoding protocol (e.g., H.264, H.265, and so forth), an encoding rate, and so forth. In this particular implementation, the encoding information 512 specifies block size for the encoding blocks of the optimized grid 506. The block size may be specified in any suitable way, such as w pixels×h pixels for the individual encoding blocks.

In an additional or alternative implementation, the encoding information 512 can include position information for the optimized grid 506 relative to the original, pre-encoded media of the desktop 210. The position information, for instance, includes pixel coordinate boundaries from the desktop 210 for the individual encoding blocks of the optimized grid 506 and relative to the pixels of the desktop 210.

Thus, a codec that receives the encoded video data 510 and the encoding information 512 can utilize the encoding information 512 to decode the encoded video data 510 for display. The encoding information 512 may be associated with and/or included as part of the encoded video data 510 in various ways. For instance, the encoding information may be included as part of a SPS and/or a PPS included as part of (e.g., at the beginning of) the encoded video data 510.

The different encoding block sizes depicted in the scenarios above are presented for purpose of illustration, and it is to be appreciated that various different block sizes and arrangements may be utilized in accordance with the claimed implementations. Further, the example block grids are typically not visible (i.e., displayed) along with associated media, but are depicted to illustrate data representations of media that is encoded and decoded according to implementations discussed herein.

Thus, these example scenarios demonstrate that techniques for encoding optimization for obfuscated media enable media to be sharing protected as part of a media sharing experience, and enable certain participants in the screen sharing experience to view sharing protected media in the clear. Further, encoding of media that includes obfuscated media can be optimized.

Having discussed some example implementation scenarios, consider now a discussion of some example procedures in accordance with one or more embodiments.

The following discussion describes some example procedures for encoding optimization for obfuscated media in accordance with one or more embodiments. The example procedures may be employed in the environment 100 of FIG. 1, the system 1000 of FIG. 10, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102) and/or at a network-based service, such as the communication service 120.

Figure 6:
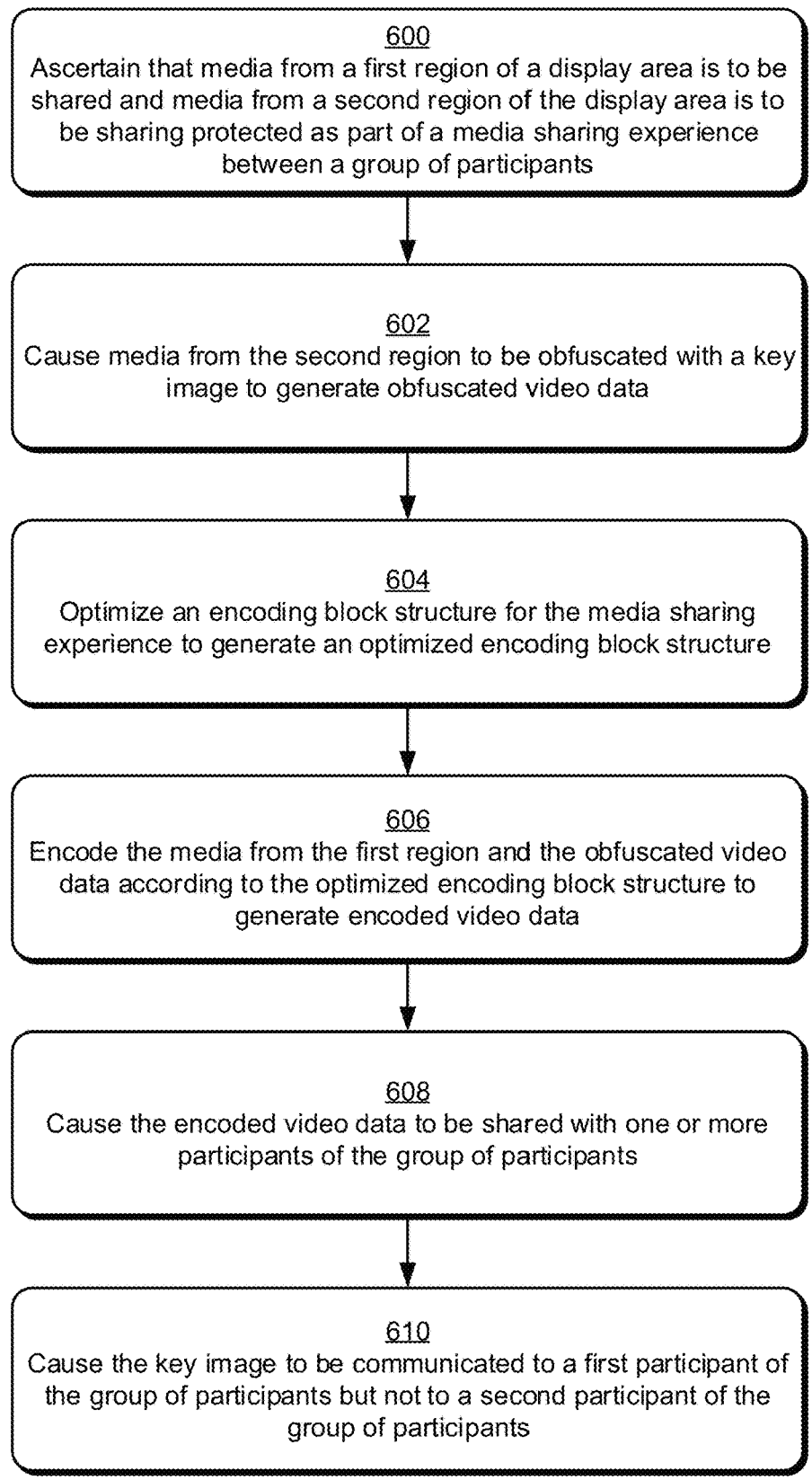
FIG. 6 is a flow diagram that describes steps in a method for optimizing encoding of obfuscated media in accordance with one or more embodiments.

FIG. 6 is a flow diagram that describes steps in a method in accordance with one or more implementations. The method describes an example procedure for optimizing encoding of obfuscated media in accordance with one or more implementations. In at least some implementations, the method may be performed at least in part at the client device 102 (e.g., by the communication client 110) and/or by the communication service 120.

Step 600 ascertains that media from a first region of a display area is to be shared and media from a second region of the display area is to be sharing protected as part of a media sharing experience between a group of participants. The media sharing experience, for instance, is part of a real-time communication session that involves the group of participants.

Generally, the media from the second region can be designated as sharing protected in various ways. A user, for instance, can provide input designating the second region and/or the media from the second region as sharing protected. Alternatively or additionally, an application that presents the media from the second region can be designated as sharing protected. Various other techniques may be employed to designate media and/or particular regions of a display area as sharing protected.

Step 602 causes media from the second region to be obfuscated with a key image to generate obfuscated video data. The key image generally represents a digital image, such as a photograph, a digital drawing, a scanned image, and so forth. The media from the second region can be obfuscated in various ways, such as using an suitable obfuscation, scrambling, and/or encryption protocol. In at least one implementation, the obfuscation is implemented by performing an exclusive or (XOR) operation using the media from the second region and the key image as inputs to generate the obfuscated video data. Alternatively or additionally, the obfuscation can include encrypting the media from the second region using the key image as an encryption key.

Step 604 optimizes an encoding block structure for the media sharing experience to generate an optimized encoding block structure. The optimization, for instance, is based on one or more of a size of the second region or a position of the second region relative to the display area. As detailed above, the optimization reduces a number of encoding blocks that include the obfuscated video data.

Step 606 encodes the media from the first region and the obfuscated video data according to the optimized encoding block structure to generate encoded video data. The optimized block structure, for instance, is used to divide the media and the obfuscated video data into blocks (e.g., frames) that are then encoded using any suitable encoding protocol, such as H.264, H.265, and so forth. Generally, the encoding generates an encoded video stream that can be shared in various ways.

Step 608 causes the encoded video data to be shared with one or more participants of the group of participants. The encoded video data can be shared in various ways, such as by streaming to the data to the group of participants, storing the data at a storage location that is accessible to the participants, and so forth. The encoded video data, for instance, is transmitted to the participants as part of a real-time communication session.

According to one or more implementations, encoding information is also shared with the participants. The encoding information, for instance, includes information that indicates how the video data was encoded, and can be used to decode the video data. Examples of the encoding information include an encoding protocol/technique used to encode the video data, an encoding rate, a description of a block size and/or position of the optimized block structure, and so forth.

Step 610 causes the key image to be communicated to a first participant of the group of participants but not to a second participant of the group of participants. The first participant, for instance, is a privileged participant, whereas the second participant is not. Thus, the first participant can utilize the key image to de-obfuscate the obfuscated video data to view the media from the first region in the clear. An endpoint device associated with the first participant, for instance, can decode the encoded video data and use the key image to de-obfuscate the obfuscated video data to view the media from the second region in the clear.

Since the second participant does not have access to the key image, the second participant cannot de-obfuscate the media from the second region. Thus, the second participant is unable to view the media from the second region in the clear. An endpoint device associated with the second participant, for instance, can decode and view the media from the first region in the clear, but cannot de-obfuscate the obfuscated video data and view the media from the second region in the clear. Thus, the media from the second region is protected from being shared in the clear with the second participant.

While the scenarios and procedures described herein are discussed with reference to a single region of sharing protected media, it is to be appreciated that techniques for encoding optimization for obfuscated media can be employed to sharing protect media from multiple different regions of a display area. For instance, consider the following example procedure.

Figure 7:
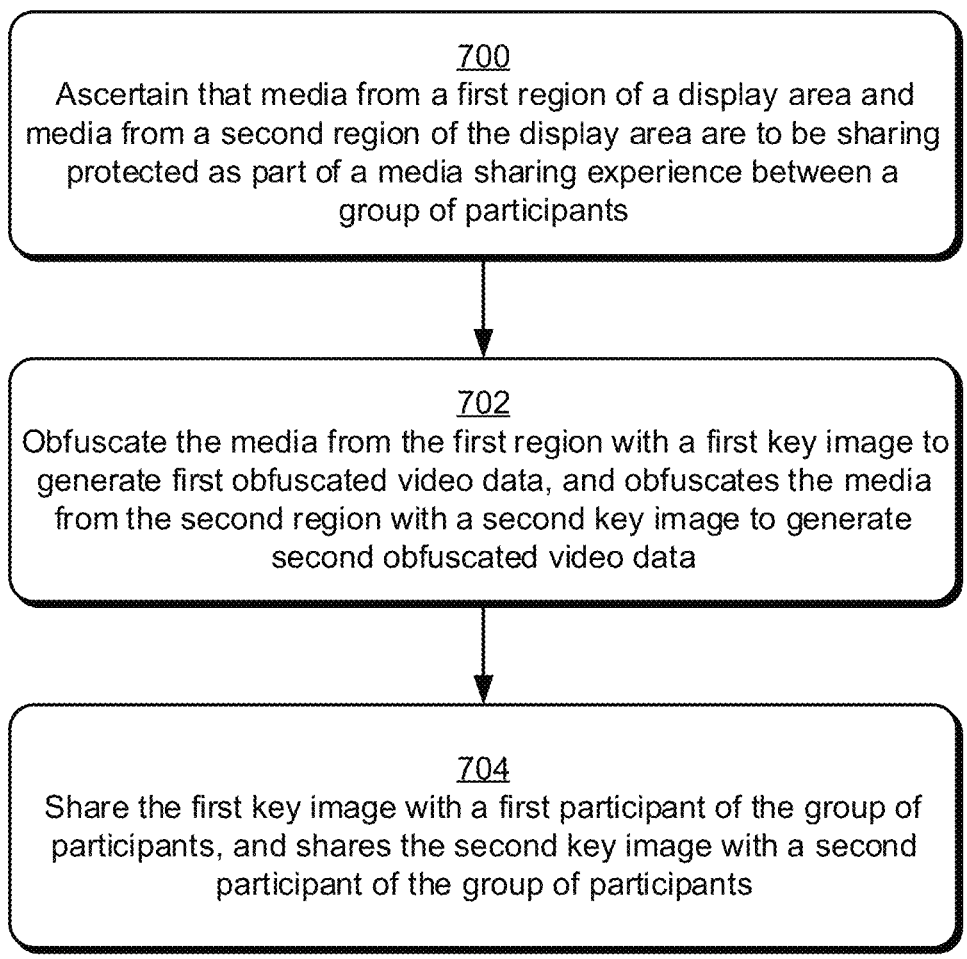
FIG. 7 is a flow diagram that describes steps in a method for obfuscating multiple different regions of video data in accordance with one or more embodiments.

FIG. 7 is a flow diagram that describes steps in a method in accordance with one or more implementations. The method describes an example procedure for obfuscating multiple different regions of video data in accordance with one or more implementations. In at least some implementations, the method may be performed in conjunction with the method described above with reference to FIG. 6.

Step 700 ascertains that media from a first region of a display area and media from a second region of the display area are to be sharing protected as part of a media sharing experience between a group of participants. A user, for instance, identifies the media from the first region and the media from the second region as being sharing protected. Different ways of identifying media as sharing protected are described above.

Step 702 obfuscates the media from the first region with a first key image to generate first obfuscated video data, and obfuscates the media from the second region with a second key image to generate second obfuscated video data. The first key image and the second key image, for instance, represent different digital images that are used to obfuscate the media from the first region and the media from the second region, respectively.

Step 704 shares the first key image with a first participant of the group of participants, and shares the second key image with a second participant of the group of participants. The first key image, for instance, is not shared with the second participant, and the second key image is not shared with the first participant. Thus, the first participant (e.g., the first participant's endpoint device) can utilize the first key image to de-obfuscate the first obfuscated video data to view the media from the first region of the display area in the clear. The first participant does not have access to the second key image, however, and thus is unable to de-obfuscate the second obfuscated video data and view the media from the second region in the clear.

Further, the second participant (e.g., the second participant's endpoint device) can utilize the second key image to de-obfuscate the second obfuscated video data to view the media from the second region of the display area in the clear. The second participant does not have access to the first key image, however, and thus is unable to de-obfuscate the first obfuscated video data and view the media from the first region in the clear. Thus, different portions of media can be selectively obfuscated with different key images and the different key images can be provided to different participants to enable sharing protected media to be selectively viewable by different participants and/or sets of participants.

In at least some implementations, the encoding block structure optimizations discussed herein can be utilized for multiple obfuscated portions of media to minimize a number of encoding blocks that include obfuscated media from the multiple obfuscated portions of media.

Figure 8:
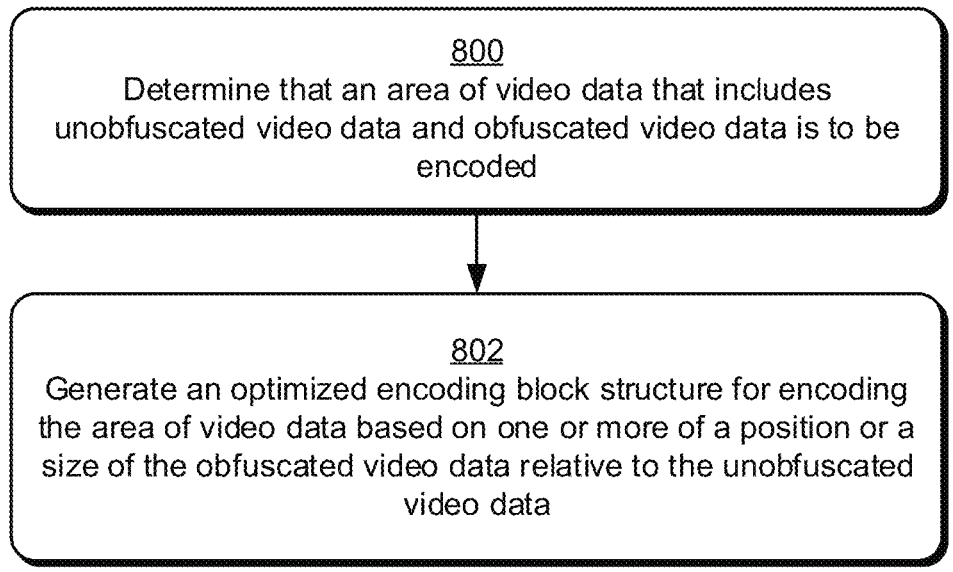
FIG. 8 is a flow diagram that describes steps in a method for optimizing encoding blocks in accordance with one or more embodiments.

FIG. 8 is a flow diagram that describes steps in a method in accordance with one or more implementations. The method describes an example procedure for optimizing encoding blocks in accordance with one or more implementations. In at least some implementations, the method may be performed in conjunction with the methods described above with reference to FIGS. 6 and 7.

Step 800 determines that an area of video data that includes unobfuscated video data and obfuscated video data is to be encoded. The optimizer module 136, for instance, determines that media displayed in a display area is to be encoded, and that the media includes unobfuscated media and obfuscated media.

Step 802 generates an optimized encoding block structure for encoding the area of video data based on one or more of a position or a size of the obfuscated video data relative to the unobfuscated video data. The optimizer module 136, for example, determines a size of the region of obfuscated video data, e.g., n pixels×n' pixels. The optimizer module 136 further determines a position of the obfuscated video data relative to the area of video data. The position, for instance, can be determined in terms of pixel coordinates (x, y) that define boundaries of the obfuscated video data. The optimizer module 136 then determines an optimized encoding block arrangement for encoding the area of video data based on one or both of the size and the position of the obfuscated video data. Generally, the optimized encoding block structure reduces a number of encoding blocks that include obfuscated video data as compared with an encoding block structure that does not consider a size and/or position of the obfuscated video data. Reducing a number of encoding blocks that include obfuscated data reduces resources (e.g. processor and memory resources) needed to decode and de-obfuscate the encoded video data since fewer blocks of obfuscated video data will need to be decoded and de-obfuscated.

Figure 9:
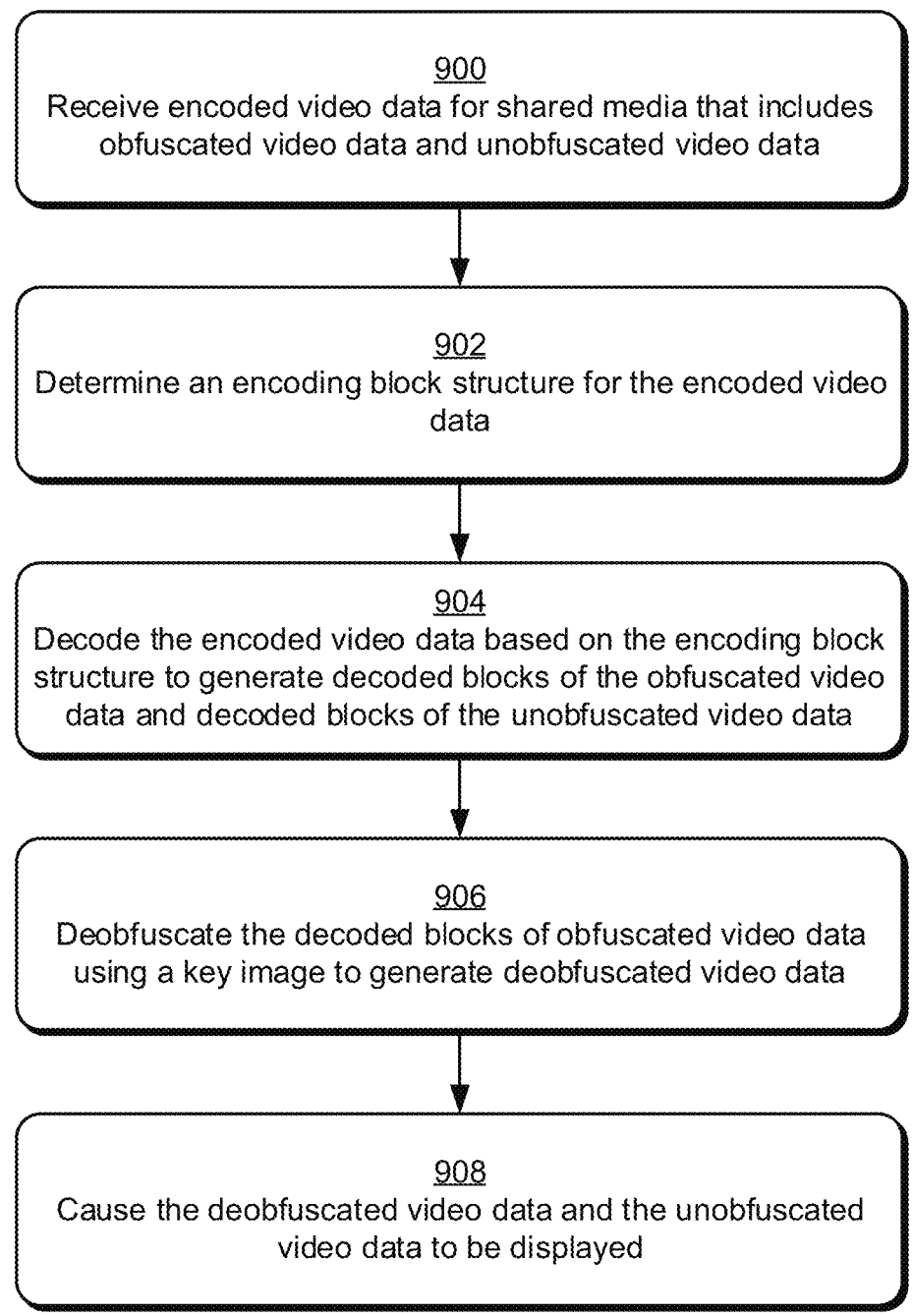
FIG. 9 is a flow diagram that describes steps in a method for decoding encoding video data that includes obfuscated video data in accordance with one or more embodiments.

FIG. 9 is a flow diagram that describes steps in a method in accordance with one or more implementations. The method describes an example procedure for decoding encoding video data that includes obfuscated video data in accordance with one or more implementations.

Step 900 receives encoded video data for shared media that includes obfuscated video data and unobfuscated video data. The encoded video data, for instance, is received as part of a real-time communication session. In at least some implementations, the encoded video data is received at an endpoint device from a remote device that generates the shared media, and encodes the shared media to generate the encoded video data.

Step 902 determines an encoding block structure for the encoded video data. The encoding block structure, for instance, is identified in encoding information included with the encoded video data. The encoding information, for instance, represents non-encoded data that specifies various information about how the encoded video data was encoded, such as an encoding protocol used to encode the shared media to generate the encoded video data. Generally, the encoding block structure can be specified in various ways, such as with reference to block size and block coordinates (e.g., pixel coordinates) for encoded blocks if video data.

Step 904 decodes the encoded video data based on the encoding block structure to generate decoded blocks of the obfuscated video data and decoded blocks of the unobfuscated video data. The encoding block structure, for instance, identifies different discrete blocks of encoded video data. Thus, each block can be decoded to generate decoded blocks of obfuscated video data and decoded blocks of unobfuscated video data.

Step 906 deobfuscates the decoded blocks of obfuscated video data using a key image to generate deobfuscated video data. The key image, for instance, is used as a deobfuscation key for deobfuscating the obfuscated video data.

Step 908 causes the deobfuscated video data and the unobfuscated video data to be displayed. The deobfuscated video data and the unobfuscated video data, for instance, can be displayed together to present an integrated video image. In at least some implementations, the integrated video image includes the shared media as part of a media sharing experience. The media sharing experience, for instance, represents a screen sharing experience that presents media displayed on a display screen of a remote device.

According to implementations discussed herein, the procedures described above can be performed dynamically multiple times during a media sharing experience to obfuscate sharing protected regions of media, and to optimize encoding block structures based on attributes of obfuscated regions of media.

Accordingly, techniques discussed herein provide a wide variety of scenarios and implementations for protecting certain media from being accessed in the clear during a media sharing experience, and optimizing encoding based on attributes of protected media. This enhances user privacy by allowing a user to designate certain media as sharing protected, and reduces computational resource consumption by optimizing encoding to account for attributes of regions of obfuscated media.

Having discussed some example procedures, consider now a discussion of an example system and device in accordance with one or more embodiments.

Figure 10:
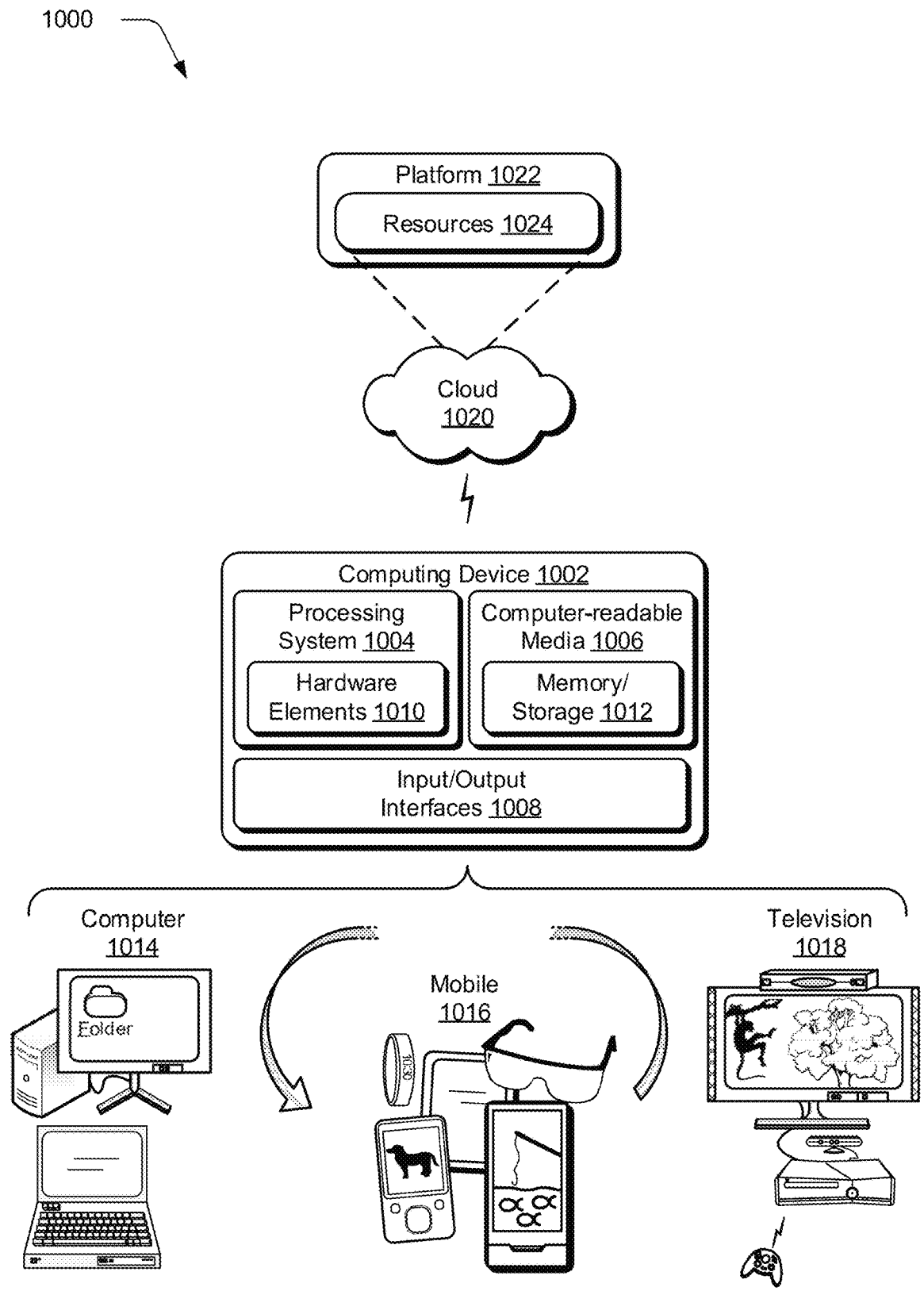
FIG. 10 illustrates an example system and computing device as described with reference to FIG. 1, which are configured to implement embodiments of techniques described herein.

FIG. 10 illustrates an example system generally at 1020 that includes an example computing device 1022 that is representative of one or more computing systems and/or devices that may implement various techniques described herein. For example, the client device 102, the endpoint devices 116, and/or the communication service 120 discussed above with reference to FIG. 1 can be embodied as the computing device 1022. The computing device 1022 may be, for example, a server of a service provider, a device associated with the client (e.g., a client device), an on-chip system, and/or any other suitable computing device or computing system.

The example computing device 1022 as illustrated includes a processing system 1024, one or more computer-readable media 1026, and one or more Input/Output (I/O) Interfaces 1028 that are communicatively coupled, one to another. Although not shown, the computing device 1022 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1024 is representative of functionality to perform one or more operations using hardware. Accordingly, the processing system 1024 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1026 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1026 may be configured in a variety of other ways as further described below.

Input/output interface(s) 1028 are representative of functionality to allow a user to enter commands and information to computing device 1022, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1022 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1022. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1022, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1026 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1022 may be configured to implement particular instructions and/or functions corresponding to the software and/or hardware modules. Accordingly, implementation of modules that are executable by the computing device 1022 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1022 and/or processing systems 1024) to implement techniques, modules, and examples described herein.

As further illustrated in FIG. 10, the example system 1020 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1020, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1022 may assume a variety of different configurations, such as for computer 1014, mobile 1016, and television 1018 uses. Each of these configurations includes devices that may have generally different constructs and capabilities, and thus the computing device 1022 may be configured according to one or more of the different device classes. For instance, the computing device 1022 may be implemented as the computer 1014 class of a device that includes a personal computer, desktop computer, a multi-screen computer, laptop computer, netbook, and so on.

The computing device 1022 may also be implemented as the mobile 1016 class of device that includes mobile devices, such as a mobile phone, portable music player, portable gaming device, a tablet computer, a wearable device, a multi-screen computer, and so on. The computing device 1022 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1022 and are not limited to the specific examples of the techniques described herein. For example, functionalities discussed with reference to the sharing module 102, the obfuscation module 130, and/or the communication service 120 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1022. Resources 1024 can also include services provided over the Internet and/or through a subscriber network, such as a cellular or Wi-Fi network.

The platform 1022 may abstract resources and functions to connect the computing device 1022 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1020. For example, the functionality may be implemented in part on the computing device 1022 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 1020.

Techniques for encoding optimization for obfuscated media are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for optimizing encoding of media, the system comprising: at least one processor; and one or more computer-readable storage media including instructions stored thereon that, responsive to execution by the at least one processor, cause the system perform operations including:

ascertaining that media from a first region of shared media is to be shared and media from a second region of the shared media is to be sharing protected as part of a media sharing experience between a group of participants; causing the media from the second region to be obfuscated with a key image to generate obfuscated video data; optimizing an encoding block structure for the media sharing experience to generate an optimized encoding block structure based on one or more of a size of the second region or a position of the second region relative to the shared media; encoding the media from the first region and the obfuscated video data according to the optimized encoding block structure to generate encoded video data; and causing the encoded video data to be shared with one or more participants of the group of participants.

In addition to any of the above described systems, any one or combination of: wherein said ascertaining is responsive to user input identifying the second region; wherein the key image comprises a digital picture; wherein said obfuscating comprises performing an exclusive or (XOR) operation using the media from the second region and the key image as inputs to generate the obfuscated video data; wherein said optimizing comprises shifting a position of one or more encoding blocks of the encoding block structure such that the optimized encoding block structure has fewer encoding blocks that include the obfuscated media than an existing encoding block structure; wherein said optimizing comprises changing a size of one or more encoding blocks of the encoding block structure such that the optimized encoding block structure has fewer encoding blocks that include the obfuscated media than does an existing encoding block structure; wherein said optimizing comprises shifting a position and a size of one or more encoding blocks of the encoding block structure such that the optimized encoding block structure has fewer encoding blocks that include the obfuscated media than does an existing encoding block structure; further comprising generating encoding information that describes the optimized encoding block structure, and causing the encoding information to be shared with the one or more participants; further comprising designating a first participant of the group of participants as sharing privileged such that the key image is permitted to be accessible for the first participant to enable the obfuscated video data to be de-obfuscated for the first participant as part of the media sharing experience, and a second participant of the group of participants is not designated as sharing privileged such that the key image is not permitted to be accessible for the second participant as part of the media sharing experience; wherein the media sharing experience comprises a real-time communication session, and wherein the operations further include repeating said optimizing based on a change in the media from the second region of the shared media; wherein the display area comprises a display device of a client device, the media sharing experience comprises a real-time communication session that includes the client device and one or more other devices associated with the group of participants, and wherein said optimizing and said encoding are performed dynamically during the communication session.

A computer-implemented method for deobfuscating encoded media, the method comprising: receiving encoded video data for shared media that includes obfuscated video data and unobfuscated video data; determining an encoding block structure for the encoded video data; decoding the encoded video data based on the encoding block structure to generate decoded blocks of the obfuscated video data and decoded blocks of the unobfuscated video data; deobfuscating the decoded blocks of obfuscated video data using a key image to generate deobfuscated video data; and causing the deobfuscated video data and the unobfuscated video data to be displayed.

In addition to any of the above described methods, any one or combination of: wherein the encoded video data is received as part of a real-time communication session between two or more different devices; wherein said determining comprises determining the encoding block structure from encoding information included with the encoded video data; wherein key image comprises a digital image; wherein the key image is received separately from the encoded video data.

A computer-implemented method for optimizing encoding of media, the method comprising: ascertaining that a first region of media of shared media is to be shared and a second region of media of the shared media is to be sharing protected as part of a media sharing experience between a group of participants, media from the second region being obfuscated; optimizing an encoding block structure for the media sharing experience based on one or more of a size of the second region or a position of the second region relative to the shared media; encoding the media from the first region and the obfuscated video data according to the optimized encoding block structure to generate encoded video data; and causing the encoded video data to be shared with the group of participants.

In addition to any of the above described methods, any one or combination of: wherein said optimizing comprises shifting a position of one or more encoding blocks of the encoding block structure such that the optimized encoding block structure has fewer encoding blocks that include the obfuscated media than an existing encoding block structure; wherein said optimizing comprises changing a size of one or more encoding blocks of the encoding block structure such that the optimized encoding block structure has fewer encoding blocks that include the obfuscated media than does an existing encoding block structure; wherein the media sharing experience comprises a real-time communication session, and where said optimizing is performed dynamically while the communication session is in progress.

What is claimed is:
1. A device comprising:
a processor; and
a memory in communication with the processor, the memory comprising executable instructions that, when executed by the processor, cause the processor to control the device to perform functions of:
dividing a screen showing a video image into a plurality of encoding blocks, the screen comprising a screen-sharing portion and a sharing-protected portion, wherein the dividing of the screen causes the sharing-protection portion to be divided into a first number of the encoding blocks;
adjusting a configuration of the plurality of encoding blocks such that the sharing-protected portion is divided into a second number of the encoding blocks, the second number being smaller than the first number;
upon completing adjusting the configuration of the plurality of encoding blocks, individually encoding all of the plurality of encoding blocks to generate a plurality of encoded encoding blocks; and
transmitting, to a remote device via a communication network, all of the plurality of encoded encoding blocks.

2. The device of claim 1, wherein, for adjusting the configuration of the plurality of encoding blocks, the instructions, when executed by the processor, further cause the processor to control the device to perform a function of shifting the plurality of encoding blocks with respect to the video image or adjusting a size of the plurality of encoding blocks.

3. The device of claim 1, wherein, for dividing the screen into the plurality of encoding blocks, the instructions, when executed by the processor, further cause the processor to control the device to perform functions of:
displaying, on the screen, the video image; and
displaying, over the displayed video image, a grid dividing the screen into the plurality of encoding blocks.

4. The device of claim 1, wherein, for adjusting the configuration of the plurality of encoding blocks, the instructions, when executed by the processor, further cause the processor to control the device to perform functions of:
displaying, on the screen, the video image;
displaying, over the displayed video image, a grid dividing the screen into the plurality of encoding blocks; and
receiving a user input to adjust the configuration of the grid.

5. The device of claim 1, wherein, for adjusting the configuration of the plurality of encoding blocks, the instructions, when executed by the processor, further cause the processor to control the device to perform functions of:
displaying, on the screen, the video image;
displaying, over the displayed video image, a grid dividing the screen into the plurality of encoding blocks;
receiving a user input shifting the grid with respect to the displayed video image; and
shifting, based on the received user input, the grid with respect to the displayed video image.

6. The device of claim 1, wherein, for adjusting the configuration of the plurality of encoding blocks, the instructions, when executed by the processor, further cause the processor to control the device to perform functions of:
displaying, on the screen, the video image;
displaying, over the displayed video image, a grid dividing the screen into the plurality of encoding blocks;
receiving a user input changing an interval of the grid; and
changing, based on the received user input, the interval of the grid.

7. The device of claim 1, wherein the instructions, when executed by the processor, further cause the processor to control the device to perform a function of encrypting, prior to individually encoding the plurality of encoding blocks, the sharing-protected portion of the screen.

8. The device of claim 1, wherein the instructions, when executed by the processor, further cause the processor to control the device to perform functions of:
encrypting, prior to individually encoding the plurality of encoding blocks, the sharing-protected portion of the screen; and
transmitting, to the remote device via the communication network, a key for decrypting the encrypted sharing protected portion.

9. The device of claim 1, wherein the instructions, when executed by the processor, further cause the processor to control the device to perform a function of determining the sharing-protected portion.

10. The device of claim 1, wherein the instructions, when executed by the processor, further cause the processor to control the device to perform functions of:
displaying the video image on the screen;
receiving a user input defining the sharing-protected portion of the screen; and
determining, based on the received user input, the sharing-protected portion of the screen.

11. A method of operating a device for optimizing a video image for transmission via a communication network, comprising:
dividing a screen showing a video image into a plurality of encoding blocks, the screen comprising a screen-sharing portion and a sharing-protected portion, wherein the dividing of the screen causes the sharing-protection portion to be divided into a first number of the encoding blocks;
adjusting a configuration of the plurality of encoding blocks such that the sharing-protected portion is divided into a second number of the plurality of encoding blocks, the second number being smaller than the first number;
upon completing adjusting the configuration of the plurality of encoding blocks, individually encoding all of the plurality of encoding blocks to generate a plurality of encoded encoding blocks; and
transmitting, to a remote device via a communication network, all of the plurality of encoded encoding blocks.

12. The method of claim 11, wherein adjusting the configuration of the plurality of encoding blocks comprises shifting the plurality of encoding blocks with respect to the video image or adjusting a size of the plurality of encoding blocks.

13. The method of claim 11, wherein dividing the screen into the plurality of encoding blocks comprises:
displaying, on the screen, the video image; and
displaying, over the displayed video image, a grid dividing the screen into the plurality of encoding blocks.

14. The method of claim 11, wherein adjusting the configuration of the plurality of encoding blocks comprises:
displaying, on a display, the video image;
displaying, over the displayed video image, a grid dividing the screen into the plurality of encoding blocks; and
receiving a user input to adjust the configuration of the grid.

15. The method of claim 11, wherein adjusting the configuration of the plurality of encoding blocks comprises:
displaying, on the screen, the video image;
displaying, over the displayed video image, a grid dividing the screen into the plurality of encoding blocks;
receiving a user input shifting the grid with respect to the displayed video image; and
shifting, based on the received user input, the grid with respect to the displayed video image.

16. The method of claim 11, wherein adjusting the configuration of the plurality of encoding blocks comprises:
displaying, on the screen, the video image;
displaying, over the displayed video image, a grid dividing the screen into the plurality of encoding blocks;
receiving a user input changing an interval of the grid; and
changing, based on the received user input, the interval of the grid.

17. The method of claim 11, further comprising encrypting, prior to individually encoding the plurality of encoding blocks, the sharing-protected portion of the screen.

18. The method of claim 11, further comprising:
encrypting, prior to individually encoding the plurality of encoding blocks, the sharing-protected portion of the screen; and
transmitting, to the remote device via the communication network, a key for decrypting the encrypted sharing protected portion.

19. The method of claim 11, further comprising:
displaying the video image on the screen;
receiving a user input defining the sharing-protected portion of the screen; and
determining, based on the received user input, the sharing-protected portion.

20. A non-transitory computer readable medium containing instructions which, when executed by a processor, cause a computer to perform functions of:
dividing a screen showing a video image into a plurality of encoding blocks, the screen comprising a screen-sharing portion and a sharing-protected portion, wherein the dividing of the screen causes the sharing-protection portion to be divided into a first number of the encoding blocks;
adjusting a configuration of the plurality of encoding blocks such that the sharing-protected portion is divided into a second number of the plurality of encoding blocks, the second number being smaller than the first number;
upon completing adjusting the configuration of the plurality of encoding blocks, individually encoding all of the plurality of encoding blocks to generate a plurality of encoded encoding blocks; and
transmitting, to a remote device via a communication network, all of the plurality of encoded encoding blocks.

* * * * *